(12) United States Patent
Andrews

(10) Patent No.: US 7,641,042 B2
(45) Date of Patent: Jan. 5, 2010

(54) DRIVE CHAIN OR BELT BRUSH CLEANER AND METHOD

(75) Inventor: Basil Andrews, 3045 Southcreek Road, Suite 19, Mississauga, Ontario (CA) L4X-2X6

(73) Assignee: Basil Andrews, Mississauga, Ontario (CA)

( * ) Notice: Subject to any disclaimer, the term of this patent is extended or adjusted under 35 U.S.C. 154(b) by 0 days.

(21) Appl. No.: 12/074,610

(22) Filed: Mar. 5, 2008

(65) Prior Publication Data

US 2009/0223781 A1    Sep. 10, 2009

(51) Int. Cl.
    *B65G 45/18*    (2006.01)
(52) U.S. Cl. .................. 198/496; 15/256.5; 184/15.1
(58) Field of Classification Search .............. 198/494, 198/496; 15/82, 256.5, 256.53; 184/15.1, 184/16, 23
    See application file for complete search history.

(56) References Cited

U.S. PATENT DOCUMENTS

| | | | | |
|---|---|---|---|---|
| 3,434,273 | A | * | 3/1969 | Lovell ..................... 15/256.5 |
| 4,678,075 | A | * | 7/1987 | Bowman, Jr. ............... 198/496 |
| 5,020,637 | A | * | 6/1991 | Hoenselaar et al. ......... 184/15.1 |
| 5,657,852 | A | * | 8/1997 | Bavington ................. 198/494 |

OTHER PUBLICATIONS

Sealeze *"High Quality Brush Products For Industrial Applications"*, ISO 9001:2000 Certified, Sealeze A Unit of Jason Incorporated, pp. 2-15.

*Park Tool USA*, www.parktool.com/repair/readhowto.asp?id=24, Nov. 1, 2007; pp. 1-6.
*Park Tool USA*, www.parktool.com/products/detail.asp?cat=5 &item=CM-5, Nov. 1, 2007; pp. 1-2.
*Excel Sports Boulder*, www.excelsports.com, Nov. 1, 2007, pp. 1-2.
*Kettenmax Chain Cleaner*, www.webbikeworld.com/r3/kettenmax-chain-cleaner/ Nov. 1, 2007, pp. 1-9.
*Moose Motorcycle Chain Cleaner*, www.webbikeworld.com/r3/motorcycle-chain-cleaner/moose-chain-cleaner.htm, Nov. 1, 2007, pp. 1-3.

* cited by examiner

*Primary Examiner*—James R Bidwell
(74) *Attorney, Agent, or Firm*—Renner Otto Boisselle & Sklar

(57) ABSTRACT

An inverted coil brush assembly is particularly useful for the cleaning of a chain or belt and the like as a hand tool or part of an apparatus through which the chain or belt moves. The inverted coil brush assembly has an open coil structure with a long lead and can easily be threaded on and removed from a belt or chain. The tool is sufficiently flexible that the axial hole (ID) through its center can be enlarged or contracted by axial elongation or compression of the tool. The tool and its method of application and use enable it to be used as a hand tool or as a component in a transmission for example. It may be adjusted manually or automatically. The tool preferably has a lead or space between adjacent coils of from about ¼ to 2 times or more the outside diameter (OD) of the coil. The OD to ID ratio may vary from our 2:1 to about 7:1. A preferred ratio is about 3:1.

28 Claims, 6 Drawing Sheets

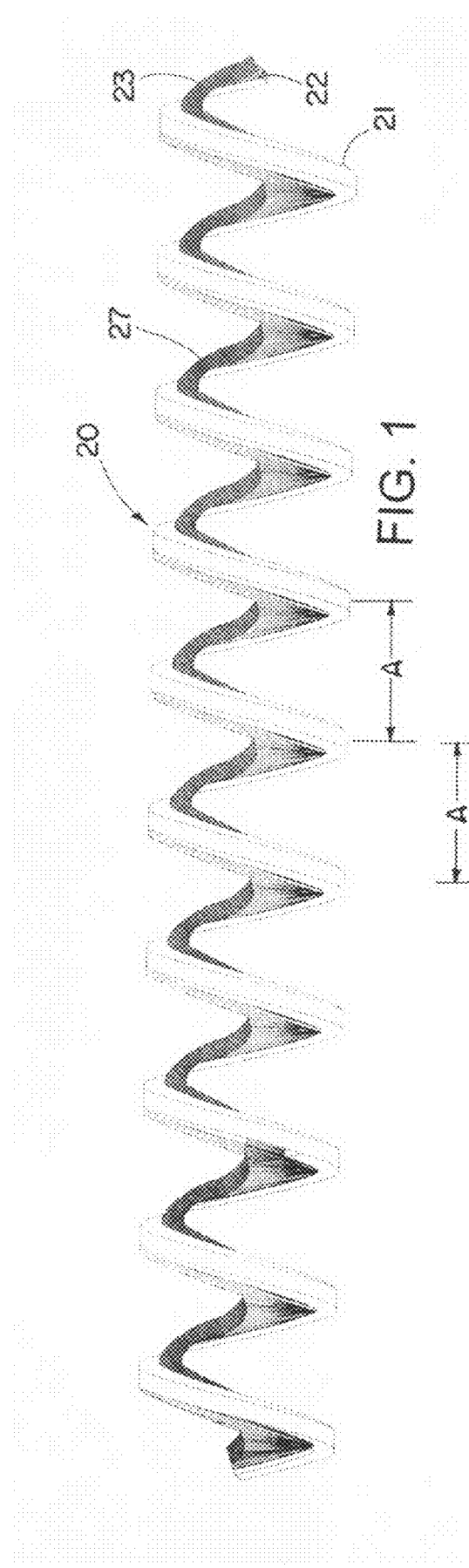
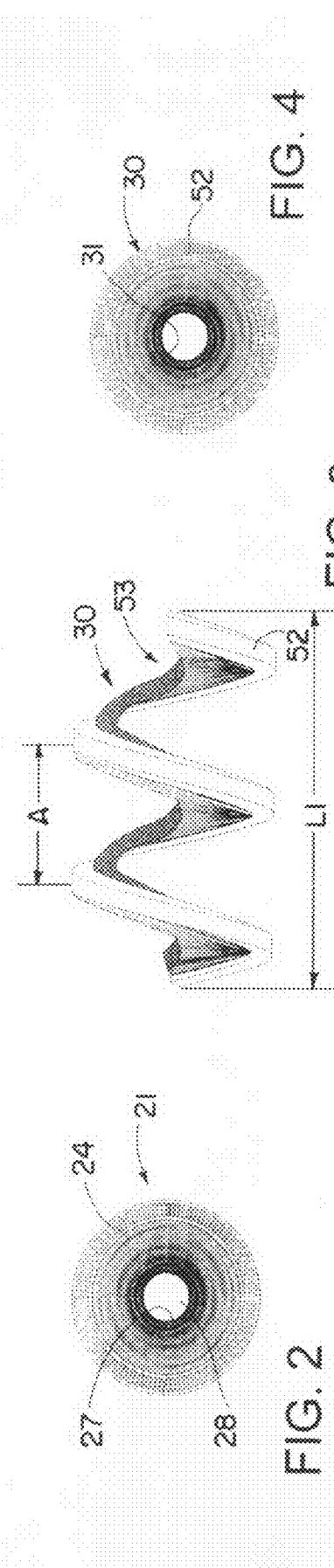
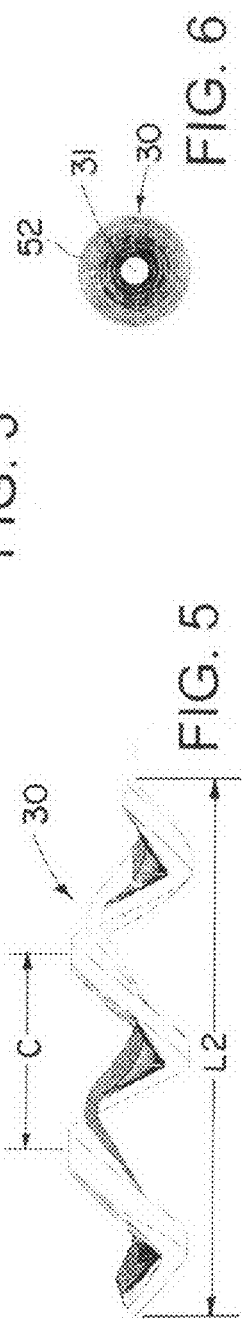
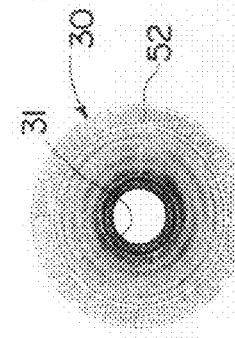
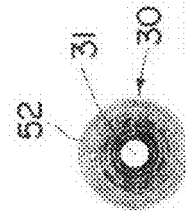
FIG. 1
FIG. 2
FIG. 3
FIG. 4
FIG. 5
FIG. 6

DRIVE CHAIN OR BELT BRUSH CLEANER AND METHOD

DISCLOSURE

This invention relates generally as indicated to a drive chain or belt brush cleaner and method, and more particularly to a low cost yet effective cleaning brush and method easily constructed, mounted and adjusted for effective and efficient chain or belt cleaning.

BACKGROUND OF THE INVENTION

In bicycles, motorcycles, and other chain or belt driven vehicles, as well as power train drives, there are no more irritating problems than to have the chain or belt derail or come off the sprockets, or break. This is especially true where a complex multi-sprocketed gear shift or transmission may be involved, with the chain or belt passing over or around a number of sprockets of varying size.

Often the cause of these problems is dirt or debris on the chain or belt. If debris gets wedged between the chain and sprocket, or in the opening of a roller chain and sprocket tooth, or between the teeth of a belt, the chain or belt may derail, or worse break. Moreover dirt or debris on the chain or belt will cause excess wear on the chain or belt and sprockets as well as the associated bearings, sleeves, pins, rollers or links. Also, the efficiency of a dirty chain, belt, or drive is poor, requiring more energy. Dirty drive chains and transmissions are a common problem, and even an expected problem with for example, dirt bikes or mountain bikes, whether powered or pedaled.

Chain cleaning brush assemblies have been proposed and may involve a rotary brush with radially projecting bristles rotating against the top and/or bottom of the chain. The brushes may be driven by movement of the chain. They are more often only used in a shop or garage. To move the chain the rear drive wheel is elevated and rotated by backpedaling. The bigger the vehicle the more difficult the task.

The assemblies with a rotating brush require energy to operate and as the bristles wear the cleaning is less effective. Such assemblies are costly, difficult to maintain and clean, if clogged, and may only clean portions such as the top (inside) and/or bottom (outside) of the chain. Dirt on the side links of the chain or in narrow gaps may escape the rotating brushes, but none-the-less damage the chain, sprockets, or transmission.

Other proposed chain cleaners involve a box which clamps around the chain. The box includes a multiplicity of fixed straight brushes that provide agitation to remove grit. Chain cleaning fluid may be introduced into the box to drain out the bottom. A major problem with such cleaners, other than the multiplicity of parts is that they are designed for a single size or type of chain. Other sizes or types may require brush replacement or even brush trimming.

Inverted coil brush assemblies such as those made by SEALEZE® of Richmond, Va., U.S.A., are helical strip brushes with bristles directed inwardly. Such brushes are usually formed with a tight or short-lead helix and are often used in process or manufacturing operations such as the removal of scale from wire or rod. Inverted strip brush rings may be used as environmental seals for reciprocating parts.

SUMMARY OF THE INVENTION

Applicant has discovered that a section of an inverted coil brush assembly with a relatively long lead or distance between adjacent coils makes an excellent chain or drive belt cleaner and can be adapted to clean efficiently a wide variety of sizes of drive chains or belts.

The cleaning brush for drive chains or belts is a length of an inverted coil strip brush assembly with the filaments or bristles directed inwardly. The coil or helix has a substantial lead so that there is space between successive coils. Although relatively stiff, the tool is also somewhat flexible and has characteristics of a somewhat stiff coil spring.

This open coil structure of the tool enables it to be assembled on the belt or chain by a simple threading operation placing the tool beside the belt or chain, and then rotating the tool until it threads itself on the belt or chain and completely surrounds the chain or belt. Initially the axes of the tool and the belt or chain will be at a slight acute angle, but when the assembly is complete the axes will be aligned. The tool has sufficient flexibility or bendability to align its axis with that of the belt or chain as it is threaded on. The tool may be removed from the belt or chain simply by forcing an end off and by unscrewing the tool.

One further major advantage of the inverted coil strip brush is that the internal diameter (ID) formed by the tips of the bristles may be adjusted, simply by axially compressing or axially elongating the tool. The longer the tool and lead, the smaller the ID, and vice versa. Accordingly, the size of the axial opening in the brush may readily be adjusted for different size belts or chains, as well as to accommodate bristle wear.

The tool may be provided with a relatively short handle to grip the tool as it and the belt or chain is relatively moved. A short handle is preferred for clearance purposes during threading, and a handle extension may be clamped to it following installation.

For more permanent installations such as on machinery drive chains, the tool may be mounted in a housing surrounding the chain that has axially adjustable ends. Thus by changing the length of the housing the size of the center opening of the tool may be adjusted. Various mechanisms may be employed to change the length of the housing, either automatically or manually.

The center opening of the tool may be substantially any shape such as circular, square, diamond, or oval.

The filaments may be metal or nylon, but crimped nylon is preferred and the diameter of the filaments should be smaller than the smallest gap on a chain, which is usually the gap between the end of the sleeve and a side link. The bristle tips should be able readily to enter that gap for effective cleaning.

To the accomplishment of the foregoing and related ends the invention, then, comprises the features hereinafter fully described and particularly pointed out in the claims, the following description and the annexed drawings setting forth in detail certain illustrative embodiments of the invention, those being indicative, however, of but a few of the various ways in which the principles of the invention may be employed.

BRIEF DESCRIPTION OF THE DRAWINGS

FIG. 1 is an elevation of a length of long lead inverted coil brush;

FIG. 2 is an end view of such brush;

FIG. 3 is an elevation of a shorter form of the brushing tool seen in FIG. 1;

FIG. 4 is an end elevation of the tool of FIG. 3;

FIG. 5 is an elevation of the tool of FIG. 3 axially elongated;

FIG. 6 is an end elevation of the tool of FIG. 5 illustrating the change upon elongation of the internal diameter;

DETAILED DESCRIPTION OF THE PREFERRED EMBODIMENT

Figure 7:
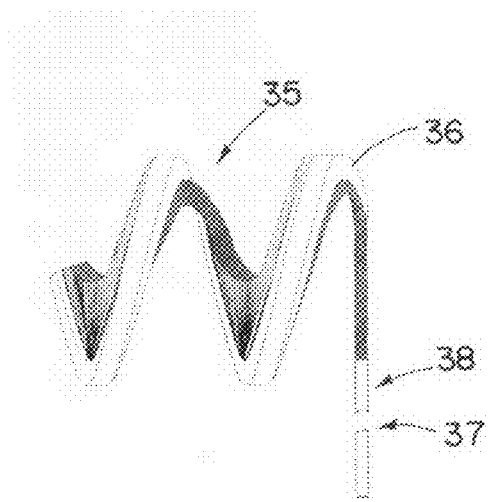
FIG. 7 is a side elevation of a tool having an axially traversely extending handle.

Referring first to FIGS. 1 and 2 there is illustrated at 20 a chain or belt cleaning brush assembly tool in the form of an inverted coil brush with a long lead. Like any strip brush the tool includes a U-shape backing 21 in which the bristles 23 are bent or folded. The backing, sometimes metal, is crimped about the fold so that the bristles or filaments project from between the edges of the folded U-shape backing. The sidewalls of the backing may be slightly corrugated as shown at 24 in the crimping process to provide extra strength and rigidity.

It will be appreciated that other ways of forming the strip brush may be employed. For example, a flat continuous stack of filaments properly held may have one edge heated to form a bead that is then thermally welded to a plastic backing.

Other means of making strip brushes may be used such as using a tape configuration or a binder or adhesive to join the filaments with or without a backing.

The inwardly projecting bristles or filaments 23 are preferably crimped nylon and each filament is of a diameter sufficiently small to enable the inwardly directed tips to enter the smallest gap encountered in a chain or belt as hereinafter explained.

The lead of the coil of FIG. 1 is fairly long. By lead is meant the axial distance between adjacent coils. This is shown by the distance A in FIG. 1. In FIG. 1 that lead distance is about ¾ the outside diameter of the coil. A lead ranging from about one-quarter to about twice the outside diameter is preferred. This provides openings between the coils and enables the inverted coil brush to be threaded on and off a chain or belt with relative ease.

As seen in FIG. 2 the uniform trim length is from the edge of the backing to the tips 27 of the filaments and provides a circular axial interior opening 28, the diameter of which is the interior diameter or ID of the brushing tool. Accordingly, the tool has an outside diameter and an inside diameter. The trim length of the strip is preferably greater than 50% of the difference between the OD and ID of the coil.

The OD to ID relationship may vary from about 2:1 to about 7:1. A preferred ratio is about 3:1.

The number of coils or axial length of the tool may vary. In FIG. 1 there is illustrated a tool 20 that has about ten coils and an axial length of about 10×A. However in FIG. 3 there is shown a tool 30 that has a length of about 2.5×A. In some applications a single coil may be used. The length and size of the tool may thus vary from about 1 (360°) full twist or turn to 10 (3600°) full twists or turns, or more depending upon the application. For a hand held tool, such as may be used on a bike chain, the shorter version is preferred. Longer versions may be used on industrial chain and belt drive installations. However, once the tool is formed on a continuous basis in the inverted coil form shown, it can be cut to any length desired.

As indicated above and explained hereinafter, one of the major advantages of the tool seen in FIG. 1 or 3 is the ability to thread the tool on and off a chain or belt. While it may be possible to thread a disconnected drive chain through a hole, that is not possible with a continuous drive belt.

Another important advantage of the illustrated tool is the ability to change or adjust the inside diameter of the tool both to accommodate different size or types of chains or belts, and to compensate for bristle tip wear. This adjustment can be seen by comparing FIGS. 3 and 4 to FIGS. 5 and 6, respectively.

In comparing FIG. 5 to FIG. 3, it will be seen that the tool 30 shown in FIG. 5 has been axially lengthened to a length L2 as compared to the shorter length L1 of FIG. 3. The lead A of FIG. 3 has enlarged to the lead C of FIG. 5. The elongation of the tool seen in FIG. 5 increases the overall length and increases the helix angle (the angle of the coil to a radius). However, as seen in comparing FIGS. 4 and 6, the axial elongation of the tool reduces both the outside diameter (OD) and more importantly the inside diameter (ID) or size of the hole 31.

Conversely, if the tool shown in FIG. 5 is axially compressed it will revert to the tool shown in FIG. 3 and as seen in comparing both FIGS. 6 and 4; not only the OD but the ID enlarges.

The tool 30 shown in FIGS. 3-6 is the same tool but simply axially compressed or elongated to change the size of the interior axial hole 31.

Figure 8:
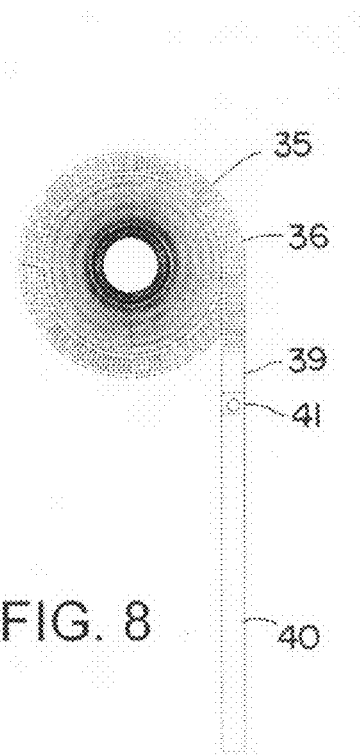
FIG. 8 is an end view of a tool with a short handle and a handle extension clamped thereto.

Referring now to FIGS. 7 and 8 there is illustrated a tool 35 of relatively short axial length. However, the backing 36 includes an extension 37 without filaments to form a projecting handle 38 extending transversely of the axis of the tool. The handle may vary in length from about two to about six inches. The handle is used to manipulate or hold the tool after installed on the belt or chain.

A shorter handle is preferred since it will encounter fewer clearance problems as the tool is installed. The short handle 39 seen in FIG. 8 can be used to assist in applying torque to the tool as it is threaded on or off the belt or chain. When installed a handle extension seen at 40 may be clamped or fastened at 41 to the shorter handle 39. When the tool is removed from the chain or belt, the handle extension may be removed. Of course other forms of handles may be used such as a simple pair of pliers.

Figure 9:
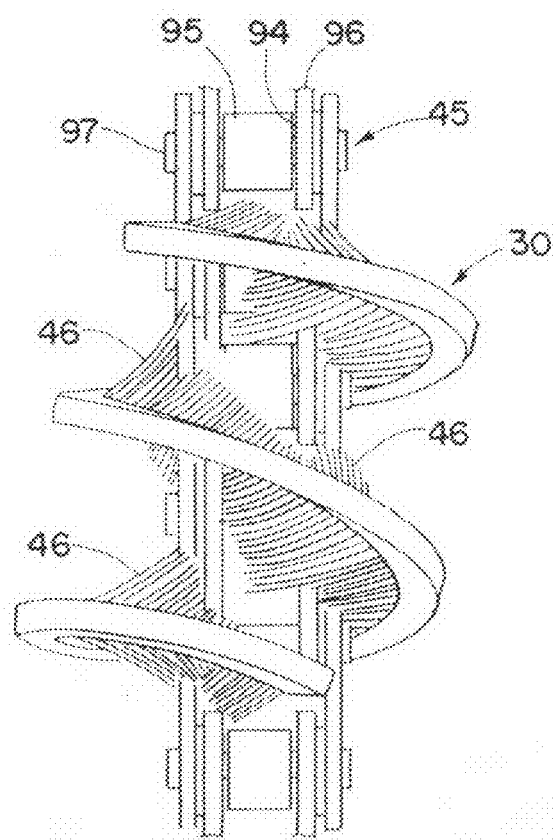
FIG. 9 is a fragmentary elevation of a tool threaded on a chain.

Referring now to FIG. 9 there is shown a section of chain 45 with the inverted coil brush 30 threaded thereon. The chain is somewhat larger than the interior hole in the tool 30 causing the filaments to flex or splay as seen at 46. With the tool threaded on the chain relative movement of the chain and tool will clean the chain.

Figure 10:
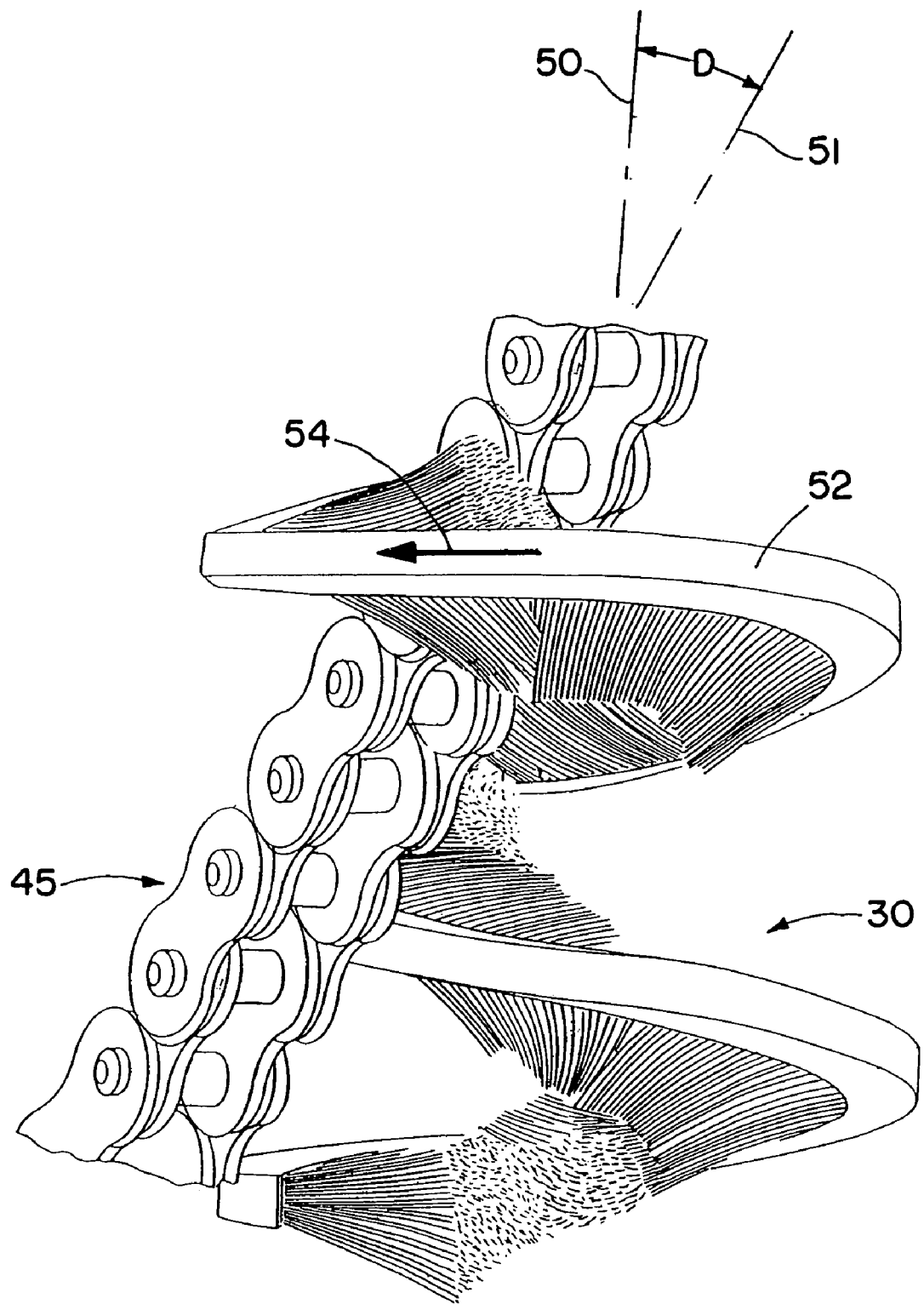
FIG. 10 is a view of the initial step of the installation threading process.
Figure 11:
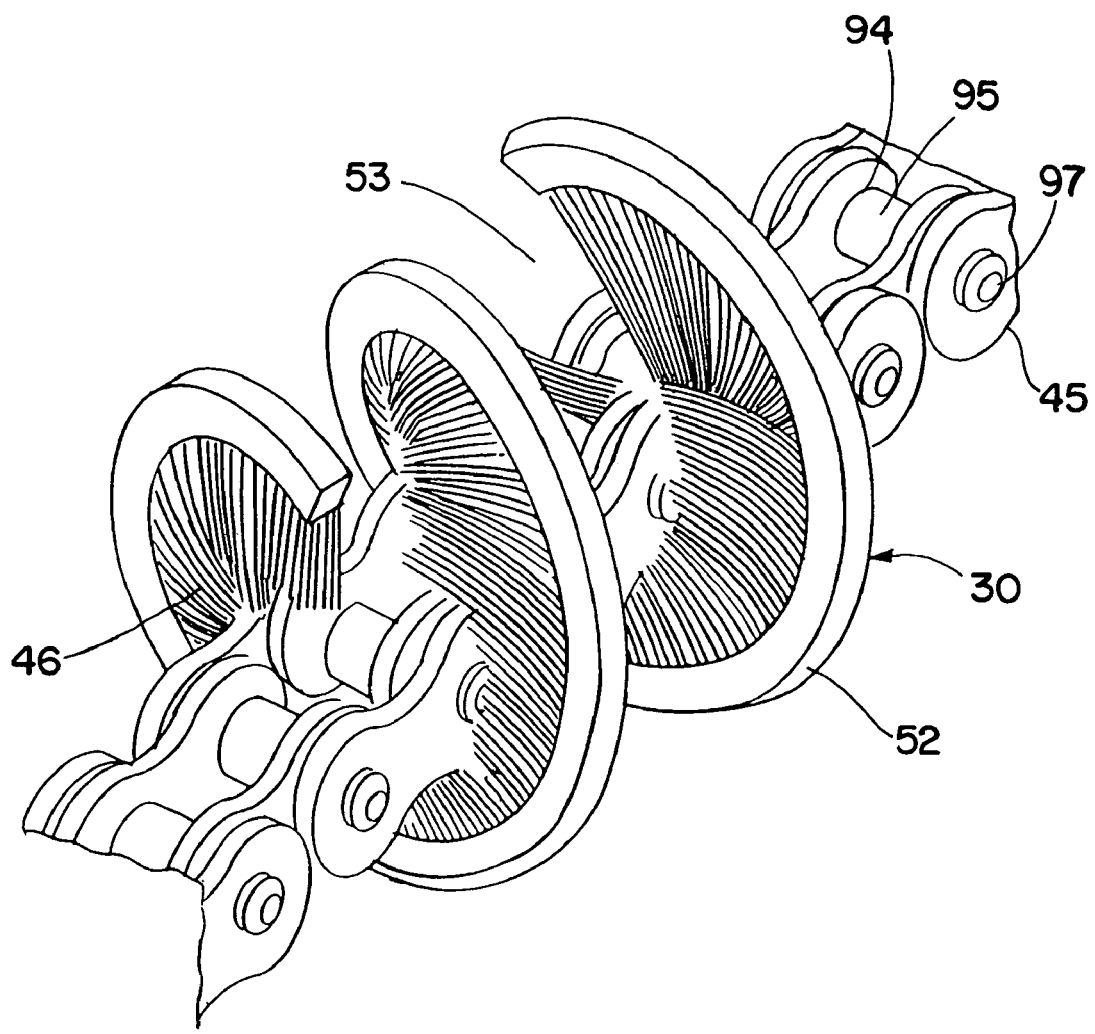
FIG. 11 is a fragmentary perspective view of the tool threaded on the chain.

Referring now to FIG. 10 the manner of threading the tool on the chain or belt is shown. The tool 30 is positioned beside or next to the chain as shown but with its axis 50 at a slight acute angle to the axis 51 of the chain or belt. This angle is shown at D in FIG. 10. The tool end coil 52 is placed so that its open end seen more clearly at 53 in FIG. 3 goes around the chain or belt as the tool is rotated in the direction of the arrow 54. Continued rotation of the tool will thread it on the chain or belt as seen in FIGS. 9 and 11.

The tool, while relatively stiff is still flexible enough that its axis 50 will align with or conform to the axis of the belt or chain when completely threaded on.

If the chain is that of a bike, the rear wheel may be lifted and the chain moved by manipulation of the pedals or the rear wheel as the tool is held. The tool may also be moved along the chain and rotated about its own axis during the cleaning operation. Several smaller or even single coil tools may be employed in sequence to clean a chain or belt.

After the chain or belt is cleaned, the tool is removed from the chain twisting or forcing one end off, and then unscrewing it, again with slight distortion enabled both by the flexibility of the filaments and of the coil backing. The brushing tool itself may be cleaned and reused many times. After the brush is removed the chain is inspected, and then is thoroughly oiled.

Figure 12:
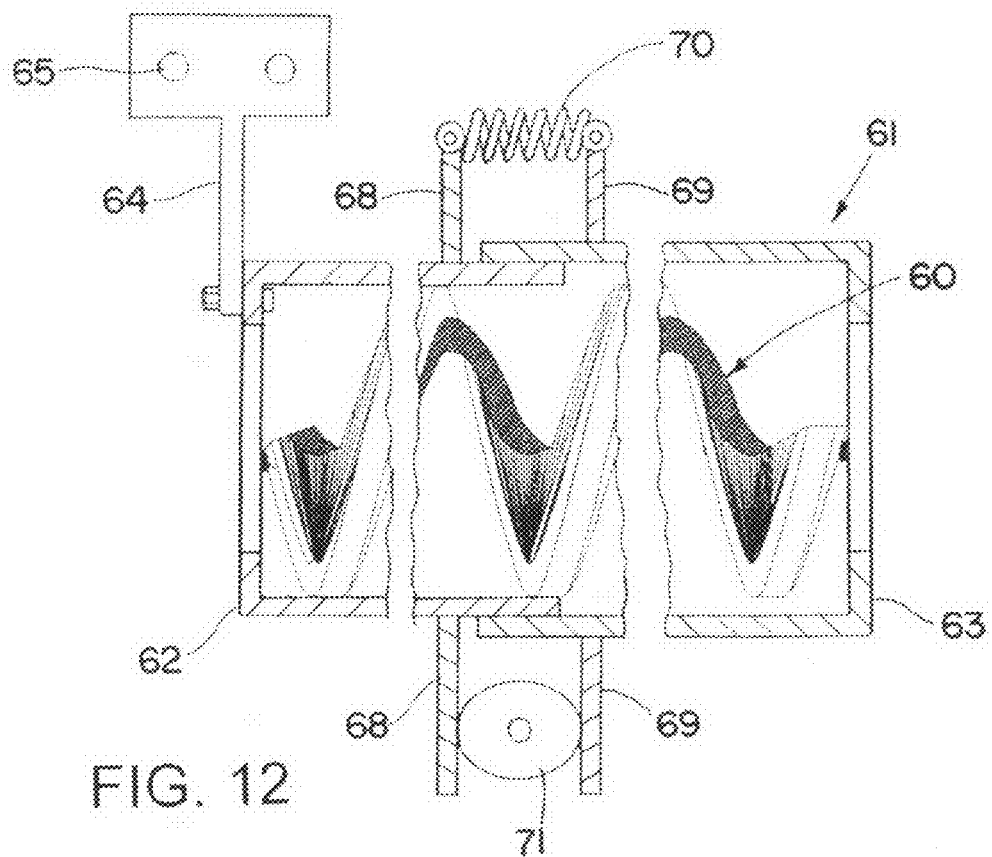
FIG. 12 is an assembly partially broken away and in section of an assembly for a drive chain transmission illustrating the tool mounted in a telescoping housing with one form of mechanism for relatively moving the two housing ends.

Referring now to FIG. 12 there is illustrated an assembly incorporating an inverted coil brush which may be more or less permanently mounted on a chain or belt transmission or even on a larger bike such as a motorcycle.

A brush such as 20 or 30 of suitable length and shown at 60 is contained in a telescoping housing 61. The housing is formed of telescoping end parts 62 and 63 that may be assembled from half round parts. The housing part 62 is relatively fixed and mounted on bracket 64 that may be secured at 65 to the machine, transmission or bike frame.

The opposite or movable part 63 of the housing telescopes over part 62 and the backing of the inverted coil brush assembly inside is removably secured to the inside of the end walls of the respective housing parts. Then by moving the housing parts one may lengthen or compress the axial extent of inverted coil brush assembly 60.

Various mechanisms may be employed for this purpose. In FIG. 12 there is shown flanges 68 and 69 projecting from the housing parts, held together by several tension springs 70 but separated by cams 71. As the cams are rotated the spacing between the flanges changes.

Figure 13:
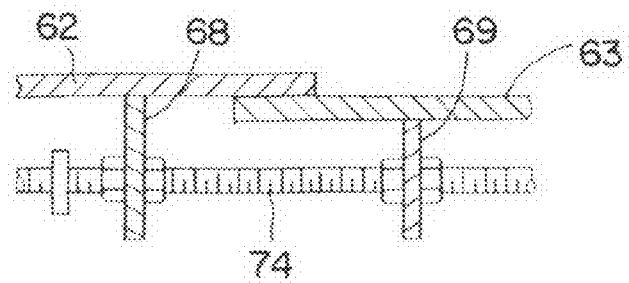
FIG. 13 is a fragmentary schematic of another form of adjustment for the housing.

In FIG. 13 several jack screws 74 interconnect the flanges and may be powered by a common source to alter the spacing of the housing parts and thus change the length of the tool.

Figure 14:
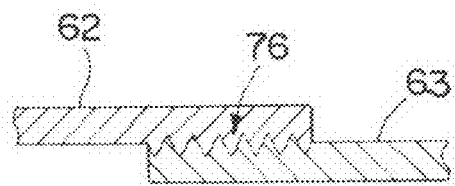
FIG. 14 is a schematic illustration of a threaded connection between the two housing parts for axial adjustment upon rotation of one.

In FIG. 14 a simple threaded connection seen at 76 permits axial adjustment altering the axial length of the tool.

The assembly seen in FIG. 12, 13 or 14 may be assembled around the chain or belt and does not require the disassembly of a chain or the removal of a belt.

FIGS. 15-18 are end views of modified tools and the only difference is that the filaments have been trimmed to provide a different shape to the interior opening or hole through the tool to adapt or conform to a wide variety of belts or chains.

Figure 15:
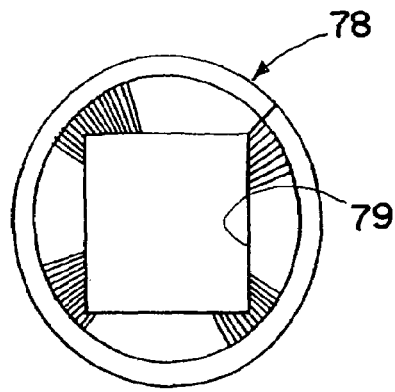
FIG. 15 is an end view of a tool with a square interior opening.
Figure 17:
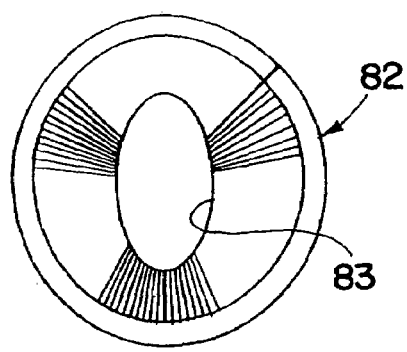
FIG. 17 is an end view of a tool with an oval interior opening.
Figure 16:
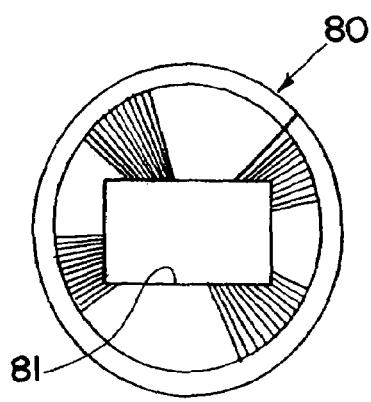
FIG. 16 is an end view of a tool with a rectangular interior opening.
Figure 18:
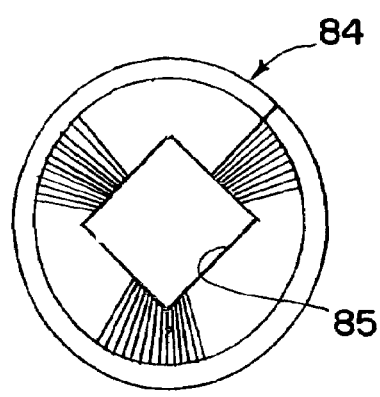
FIG. 18 is an end view of a tool with a diamond interior opening.

The tool 78 of FIG. 15 has a square axial opening 79. In FIG. 16 the tool 80 has a rectangular opening 81 particularly suitable for certain types of flat chains or rectangular drive belts. The tool 82 of FIG. 17 has an oval or elliptical opening 83 useful for cleaning any chain or belt of similar configuration. The tool 84 of FIG. 18 has a diamond opening 85. The tool embodiments of FIGS. 15-18 are merely examples of how the opening can be formed by trimming of the filaments or bristles to accommodate a wide variety of chains or belts for cleaning.

While the cross section of a typical roller drive chain is rectangular to square, drive belts come in many configurations from rectangular to oval or even diamond or V-shape. They are made usually from reinforced rubber or plastic or resins and usually have teeth projecting from the interior. Like chains, when dirty, they don't wear or function as well.

Figure 19:
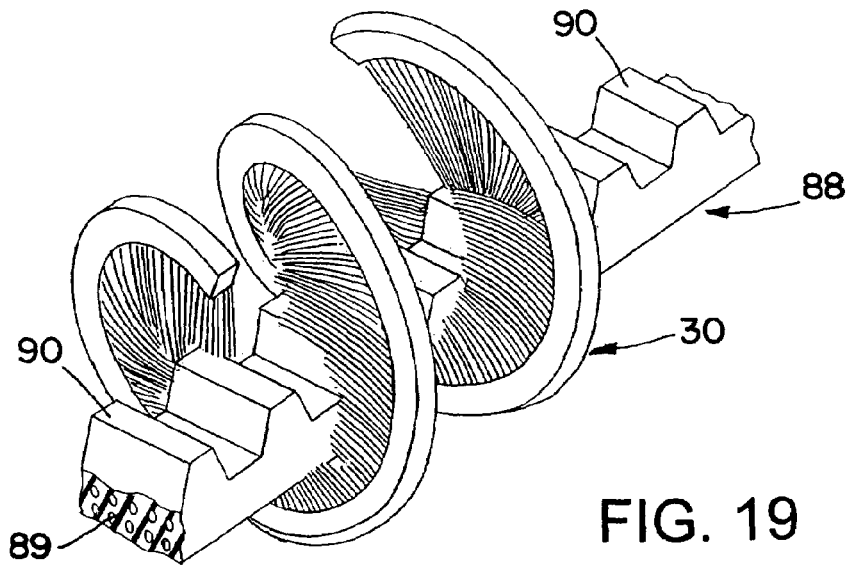
FIG. 19 is a view illustrating a typical driving belt that may be cleaned and serviced with the invention.

With reference to FIG. 19 there is illustrated an inverted coil brush assembly 30 in accordance with the invention threaded on and cleaning a drive belt 88. The tool 30 is threaded on and off the belt in the same manner as the chain. The belt typically includes reinforcement seen at 89 and inwardly projecting teeth 90.

The bristle material of the various embodiments may be metal or plastic although as indicated, nylon is preferred. The same is true of the backing 21. Both metals and plastics have the degree of stiffness yet flexibility desired for installation and removal. If greater flexibility is desired, certain types of extruded plastic backing may be employed.

As indicated the diameter of the filaments or bristles may vary, but for effective chain cleaning the diameter should be smaller than the smallest gap in the chain. This is usually the gap 94 between the sleeve 95 and adjacent side link 96 which are mounted on pins 97. The gap is necessary for rotation of the sleeve and hinging movement of the side links. Such parts and the gap are shown more clearly at the top of FIG. 9.

It has been found that the bristle or filament diameter should be no more than 80% of that gap. Thus for effective cleaning, the size of the filament is tailored to the object being cleaned.

Although the invention has been shown and described with respect to certain preferred embodiments, it is obvious that equivalent alternations and modifications will occur to others skilled in the art upon the reading and understanding of this specification. The present invention includes all such equivalent alterations and modifications, and is limited only by the scope of the claims.

The invention claimed is:

1. A method of cleaning a drive chain or belt comprising the steps of coiling a strip brush having a base and projecting filaments to form a helix with the filaments directing inwardly to form an inverted coil brush,
   placing the brush beside a drive chain or belt;
   rotating the brush to thread it on to the drive chain or belt until the brush completely surrounds the drive chain or belt;
   relatively moving the brush and drive chain or belt to clean the drive chain or belt; and
   then removing the brush by unthreading it from the chain or belt by rotating the helix.

2. A method as set forth in claim 1 wherein the brush is removed by rotating it in an opposite direction as threading it on the drive chain or belt.

3. A method as set forth in claim 1 wherein the axis of the chain or belt and the brush are initially at a shallow acute angle to each other when threading the brush on the drive chain or belt.

4. A method as set forth in claim 1 including the step of relatively moving the ends of the brush to enlarge or reduce the interior opening thereof.

5. A method as set forth in claim 1 including the step of forming the inverted coil brush with a substantial lead to space adjacent coils.

6. A method as set forth in claim 5 wherein the lead of the inverted coil brush is in excess of one-quarter its diameter.

7. A method as set forth in claim 5 wherein the lead is from about one quarter to about two times the diameter of the brush.

8. A method as set forth in claim 1 including the step of altering the internal diameter of the brush by changing its axial length.

9. A method as set forth in claim 8 including the step of placing the brush in a housing and altering the length of the housing to change the internal diameter of the brush.

10. A method as set forth in claim 1 including the step of providing the brush with a handle extending transversely of its axis.

11. A brush for cleaning a drive chain or belt comprising an open inverted coil brush having a substantial space or lead between adjacent coils whereby the brush may be threaded on and off a chain or belt, and wherein the tips of the bristles form an internal diameter hole, and means to change the size of the hole.

12. A brush as set forth in claim 11 wherein the lead of the inverted coil brush is from about one quarter to two times its diameter.

13. A brush as set forth in claim 11 wherein the lead of the inverted coil brush is in excess of one third its diameter.

14. A brush as set forth in claim 11 wherein the lead of the inverted coil brush is about half of its diameter.

15. A brush as set forth in claim 11 including a handle projecting transversely of the axis of the brush.

16. A brush as set forth in claim 11 wherein the brush has an axial length of from about one to about ten coils.

17. A brush as set forth in claim 11 wherein the brush as an OD:ID relationship of from about 2:1 to about 7:1.

18. A brush as set forth in claim 11 wherein the brush has an OD:ID relationship of about 3:1.

19. A brush as set forth in claim 11 wherein the bristles of the brush have a trim length more than half of the difference between the OD and ID of the brush.

20. A brush as set forth in claim 11 wherein the filaments are nylon.

21. A brush as set forth in claim 20 wherein the filaments are crimped.

22. A brush as set forth in claim 21 wherein the filaments have a diameter no more than 80% of the smallest gap encountered in the chain or belt.

23. A drive chain or belt cleaner comprising a strip brush having a backing and projecting filaments coiled into a cylindrical helix with the filaments directed inwardly to form an inverted coil brush assembly, an axially extending longitudinal central opening through the brush, a drive chain or belt movable through said central opening, and respective housing means supporting the ends of the coil brush, and means relatively to move said housing means supporting the ends of the coil brush for movement to reduce or enlarge said central cylindrical opening both for optimal initial contact of the filaments and chain or belt, and to maintain such contact as the filaments wear.

24. A drive chain or belt cleaner as set forth in claim 23 including means to mount said housing means in position with respect to said chain or belt.

25. A drive chain or belt cleaner as set forth in claim 23 including cam and spring means relatively to move said housing means.

26. A drive chain or belt cleaner as set forth in claim 23 including jack screw means relatively to move said housing means.

27. A drive chain or belt cleaner as set forth in claim 23 including screw means relatively to move said housing means.

28. A brush for cleaning a drive chain or belt comprising an open inverted coil brush having a substantial space or lead between adjacent coils whereby the brush may be threaded on and off a chain or belt, and wherein the brush has an internal hole formed by trimming the bristles, said hole being shaped from a group consisting of square, rectangular, oval, and diamond.

* * * * *